No. 783,076. PATENTED FEB. 21, 1905.
O. F. RHOADS.
ACETYLENE GAS GENERATOR.
APPLICATION FILED FEB. 16, 1903.
2 SHEETS—SHEET 1.
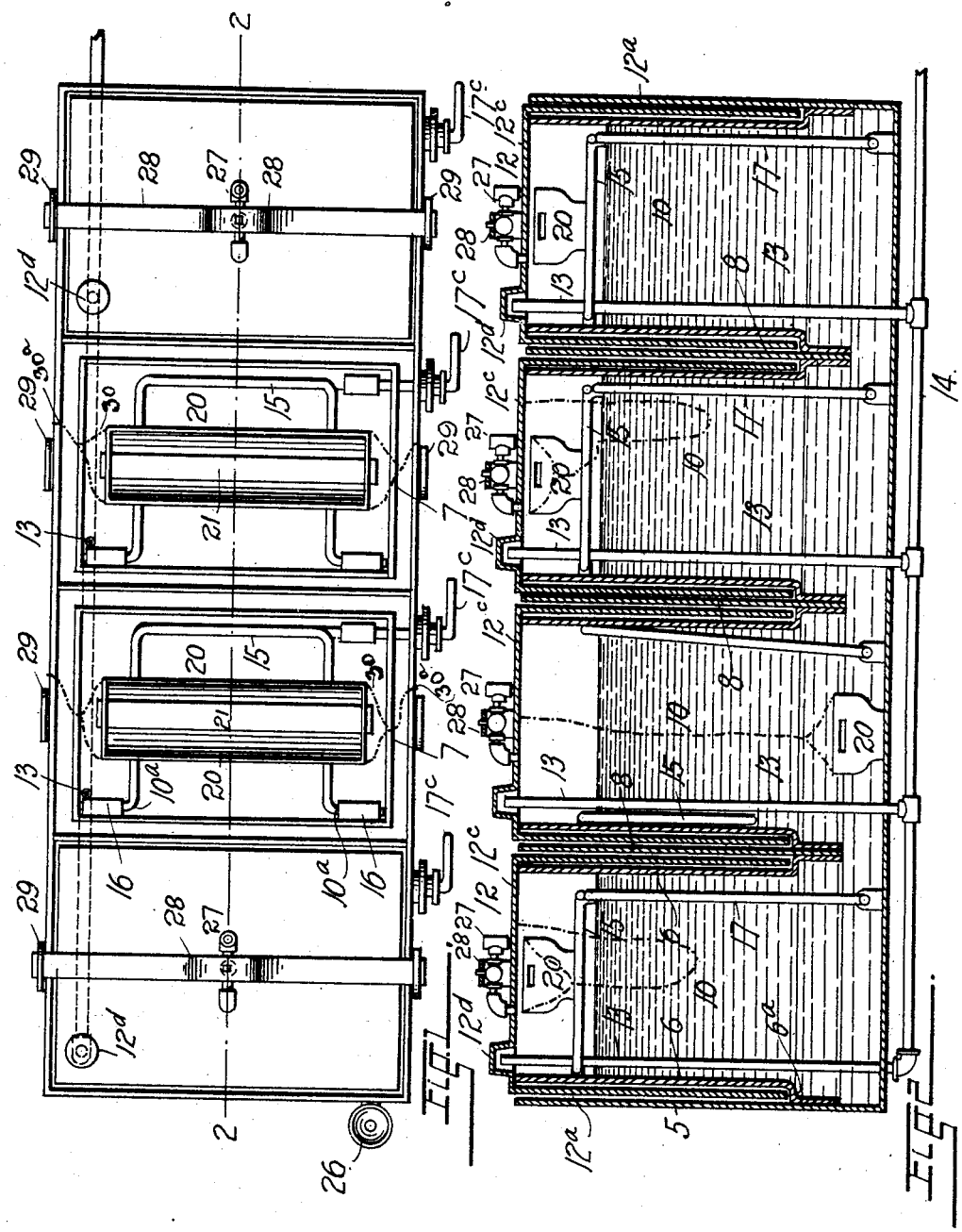
Witnesses
Inventor
O. F. Rhoads
By Attorney

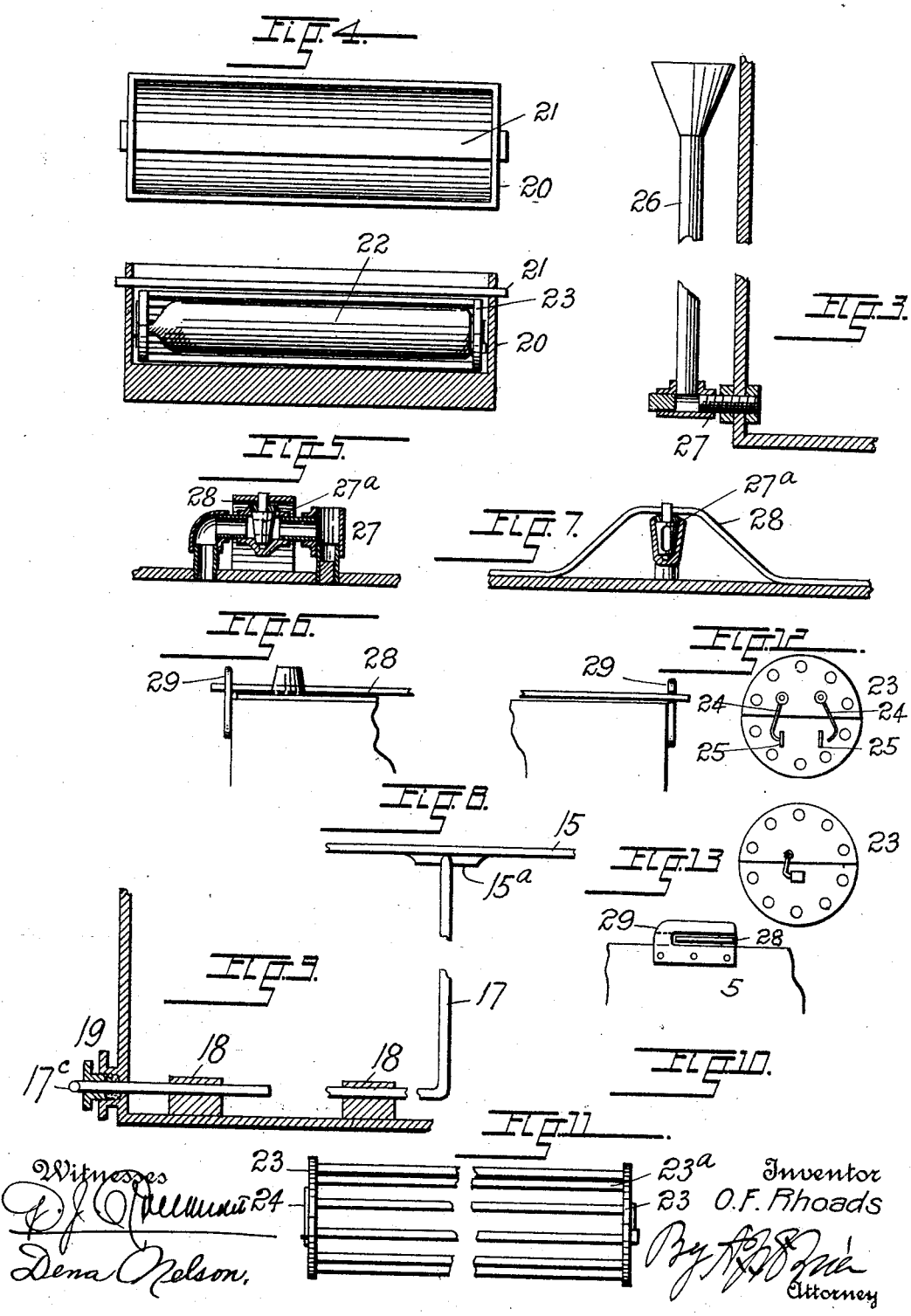

No. 783,076.

Patented February 21, 1905.

UNITED STATES PATENT OFFICE.

OLIVER F. RHOADS, OF DENVER, COLORADO.

ACETYLENE-GAS GENERATOR.

SPECIFICATION forming part of Letters Patent No. 783,076, dated February 21, 1905.

Application filed February 16, 1903. Serial No. 143,734.

*To all whom it may concern:*

Be it known that I, OLIVER F. RHOADS, a citizen of the United States of America, residing in the city and county of Denver and State of Colorado, have invented certain new and useful Improvements in Acetylene-Gas Generators; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in acetylene-gas generators, my object being to provide a device of this class which shall be simple in construction, economical in cost, reliable, durable, and efficient in use; and to these ends the invention consists of the features, arrangements, and combinations hereinafter described and claimed, all of which will be fully understood by reference to the accompanying drawings, in which is illustrated an embodiment thereof.

In the drawings, Figure 1 is a top or plan view of my improved generator with two of the covers removed. Fig. 2 is a section taken on the line 2 2, Fig. 1, showing the apparatus complete. Fig. 3 is a detail view illustrating the manner of introducing water to the tank. Fig. 4 is a top view of one of the carbid-holding troughs. Fig. 5 is a section taken through the same, showing the piece of carbid incased in a sack and placed within a cage, the bars of the cage being removed on one side. Fig. 6 is a detail view taken through the top of the cover. Fig. 7 is a section taken through the same at right angles to Fig. 6. Fig. 8 is a fragmentary end elevation of the upper part of the tank, showing the manner of locking the cover of each compartment in place. Fig. 9 is a detail view illustrating the device for supporting the swinging frame upon which the carbid-holding trough or receptacle is mounted. Fig. 10 is a fragmentary detail end view of the tank, illustrating one of the hooks for holding the bar which locks the covers in place. Fig. 11 is a detail side view of a skeleton device or cage for holding a stick or piece of carbid. Figs. 12 and 13 are end views of the same.

The same reference characters indicate the same parts in all the views.

Let the numeral 5 designate a tank divided intermediate its extremities by cross-partitions 8 into a number of intercommunicating compartments, since the said partitions do not reach entirely to the bottom of the tank, thus leaving a space below each partition for the circulation of the water. Applied to the outer wall of each compartment and to each partition 8 on opposite sides is an auxiliary wall 6, located a short distance from the main wall and partition and forming a narrow or jacket compartment 7, surrounding each tank-compartment. A short distance above the lower extremity of the partitions 8 the walls 6 are bent outwardly at right angles, as shown at $6^a$, and joined to the outer wall of the tank and the partition 8, thus closing the compartment 7 at the bottom from communication with the main compartments 10. The jacket-compartments are open at the top and filled with water, and into each is dropped the vertical wall $12^a$ of an inverted tank or cover 12, provided with an upwardly-projecting part $12^d$, forming a space into which the open upper extremity of a gas-outlet pipe 13 protrudes. The pipes 13 all communicate with the main pipe 14, leading to the gasometer. (Not shown.)

In the upper portion of each tank-compartment 10 is mounted a swinging frame 15, which, as shown in the drawings, has a U-shaped body part terminating in bent extremities $10^a$, journaled in lugs made fast to the auxiliary wall 6. Each frame 15 may be held in the horizontal position by a pivoted upright support 17, whose lower extremity is journaled in lugs 18, (see Fig. 9,) secured to the bottom of the tank. This support consists of a rod bent at right angles near the bottom of the tank. Its upper extremity when in the operative position engages and forms the support for the frame 15, the latter being provided with a stop $15^a$ to prevent the rod extremity from slipping off of the frame accidentally. The opposite extremity of the device 17 passes through an opening formed in the lower portion of the outer wall of the tank and through a stuffing-box 19, surrounding said opening. Outside of the stuffing-box the rod is provided with a crank, whereby the supporting device may be controlled from the outside for the purpose of releasing the frame 15 when it is desired to drop the carbid into the water.

The frame 15 when in the horizontal position supports a receptacle 20 containing the carbid. Near the top of each of these receptacles and in its end walls are formed openings through which is passed a flat bar 21 to hold the carbid in place. The stick or piece of carbid 22 is first placed in a sack, and this sack may be placed directly in the receptacle or it may be placed in a skeleton cage 23 (see Figs. 11, 12, and 13) and the cage placed in the receptacle, as may be desired. The cage 23 is composed of circular heads which are divided diametrically and locked together by suitable fastening devices, as hooks 24, mounted on one part and engaging staples 25, attached to the other part. The head-sections are connected by bars $23^a$, extending parallel with the axis of the cage and separated to allow the water to enter the cage freely.

Outside of the wall of the tank the apparatus is provided with a stand-pipe 26, having a funnel-shaped top for the introduction of water and whose lower extremity is connected with the tank by a short conduit 27, through which the water flows from the stand-pipe to the tank.

The top $12^c$ of the cover of each tank-compartment is provided with a valved vent for the exit and entrance of air during the operation of introducing and removing the cover from the tank. For convenience this venting device consists of a tubular U-shaped part secured to the cover and forming a handle to facilitate the manipulation of the cover. One extremity of this device passes through the cover and communicates with the tank-compartment when the cover is in place. The valve $27^a$ is opened to allow the air to enter the tank to break the vacuum when removing the cover and to permit the escape of air when placing the cover in position. Each cover is held in place against the lifting tendency of the gas by a bar 28, which is bent upwardly in the center to pass over the part $27^a$, upon which it presses, and its extremities interlock with hooks 29, secured to the opposite sides of the outer wall of the tank. These hooks or slotted brackets (see Figs. 8 and 10) are shown on opposite sides, so that the locking-bar is placed in position by moving its extremities in opposite directions.

The troughs or receptacles 20 for holding the carbid are provided with chains 30, connected with their opposite extremities. These chains are provided with hooks $30^a$, which are connected with the upper edge of the outer wall of the tank, so that the receptacles after being dropped into the tank and exhausted of their gaseous properties may be lifted out of the tank and the residue discharged.

In use the carbid is placed in a sack, as shown at 22 in Fig. 5. This carbid-containing sack is either placed directly in the receptacle 20 or placed in the cage 23 and the latter placed in the receptacle. These receptacles containing the carbid are then mounted upon the swinging frame 15 above the water in the tank, or at least in a position to prevent the water from reaching the carbid until the frames are released by moving their supports 17 to the position shown in the second compartment from the left in Fig. 1. After the receptacles 20 are all in place the covers 12 are placed in position by dropping their vertical walls into the jacket-compartments 7, which are first filled with water to form a seal around the tank-compartments in which the gas is to be generated. While putting the covers in place the valve $27^a$ of each cover is open to allow the air to escape, and after the cover is in place the valve is closed to prevent the escape of gas as soon as the carbid is dropped into the water and the generation of gas is commenced. The carbid-receptacles are then dropped into the water successively or as may be desired, and as the gas is generated it rises to the top and passes by way of the pipes 13 into the main pipe 14, leading to the gasometer. (Not shown.)

By reason of my improved construction and arrangement I am enabled to remove practically all of the residue of the carbid from the water, keeping the latter practically pure, whereby it may be used indefinitely without changing. Frequent changing of the water is undesirable, since there is considerable loss of gas every time the water is changed, a quantity of gas being lost by reason of the fact that the fresh water absorbs a certain amount of gas before there is a surplus for accumulation in the gasometer.

Having thus described my invention, what I claim is—

1. An acetylene-gas generator comprising a tank and a cover having depending walls, the tank having a jacket-compartment separated from its generating-chamber and containing water forming a seal in which the vertical wall of the cover is located, means for locking the cover in place on the tank, a gas-outlet conduit whose upper extremity is open above the water for the escape of the gas to the gasometer, a frame pivoted in the tank for supporting the carbid in place above the water, and consisting of a U-shaped body part terminating in bent extremities suitably journaled in the upper part of the tank and near one side thereof, and a pivoted support for said frame capable of manipulation from the outside of the tank, said support comprising a rod having an upwardly-projecting part whose upper extremity is adapted to engage the carbid-holding frame at a point remote from its journals, the said supporting-rod being bent at right angles near the bottom of the tank and journaled in the lower portion of the tank, its outer extremity being exposed whereby the said support may be manipulated from the outside of the tank.

2. The combination of a tank having a surrounding water seal separated from the gas-chamber of the tank, a cover provided with depending walls adapted to enter the water seal, a valved vent device attached to the cover, means for locking the cover in place on the tank, a swinging frame mounted in the tank for supporting the carbid, and comprising a U-shaped body part terminating in bent extremities suitably journaled in the upper part of the tank, and movable means for supporting the frame to hold the carbid out of the water, said means being arranged to be manipulated from the outside of the tank to drop the carbid into the water, and comprising a rod having an upwardly-projecting part whose upper extremity is adapted to engage the carbid-holding frame at a point remote from its journals, the lower portion of the rod being bent at right angles to its body part and passed through the wall of the tank in which it is journaled whereby the said support may be manipulated from the outside for the purpose of releasing the carbid-holding frame.

3. An acetylene-gas generator comprising a tank having an inner wall extending downwardly a suitable distance and bent outwardly and secured to the main wall on the inside forming a water-seal compartment around the tank, said compartment being open at the top, a cover having depending walls adapted to enter the water-seal compartment, a movable frame for supporting the carbid above the water in the tank, comprising a U-shaped frame having bent extremities and journaled in the upper part of the tank near one side thereof, a carbid-receptacle adapted to be placed on said frame, flexible devices connected with said receptacle and attached to the top of the tank whereby the receptacles may be raised out of the water and the residue discharged, and movable means for supporting the carbid-holding frame, comprising a rod having an upwardly-projecting part whose upper extremity engages the part of the frame remote from its journals, the said frame part being provided with a stop which the upright supporting part engages, the lower part of the said supporting-rod being bent and passed through the wall of the tank in which the said part is journaled whereby it is adapted to be manipulated from the outside.

In testimony whereof I affix my signature in presence of two witnesses.

OLIVER F. RHOADS.

Witnesses:
DENA NELSON,
A. J. O'BRIEN.